(12) United States Patent
Oki et al.

(10) Patent No.: US 8,382,365 B2
(45) Date of Patent: *Feb. 26, 2013

(54) HORIZONTAL MIXER

(75) Inventors: Yuzuru Oki, Chigasaki (JP); Masami Umetsu, Yokohama (JP); Takahiro Hasegawa, Fujisawa (JP); Shigehisa Sakamoto, Fujisawa (JP)

(73) Assignee: Oshikiri Machinery Ltd., Kanagawa-Ken (JP)

( * ) Notice: Subject to any disclaimer, the term of this patent is extended or adjusted under 35 U.S.C. 154(b) by 686 days.

This patent is subject to a terminal disclaimer.

(21) Appl. No.: 12/573,441

(22) Filed: Oct. 5, 2009

(65) Prior Publication Data

US 2010/0091608 A1    Apr. 15, 2010

Related U.S. Application Data

(63) Continuation-in-part of application No. 12/413,034, filed on Mar. 27, 2009, now Pat. No. 8,070,353.

(30) Foreign Application Priority Data

Mar. 28, 2008 (JP) .................................. 2008-086613
Aug. 14, 2009 (JP) .................................. 2009-187942

(51) Int. Cl.
*A21C 1/06* (2006.01)

(52) U.S. Cl. .................. 366/182.4; 366/347; 220/254.3

(58) Field of Classification Search ............... 366/182.4, 366/347; 220/254.3
See application file for complete search history.

(56) References Cited

U.S. PATENT DOCUMENTS

| 202,129 | A | * | 4/1878 | White | 220/254.3 |
| 2,011,494 | A | * | 8/1935 | Lauterbur | 366/77 |
| 4,993,606 | A | * | 2/1991 | Bolen et al. | 222/546 |
| 8,070,353 | B2 | * | 12/2011 | Oki et al. | 366/182.4 |
| 2009/0245016 | A1 | * | 10/2009 | Oki et al. | 366/182.4 |

FOREIGN PATENT DOCUMENTS

| JP | 59-26986 | 2/1984 |
| JP | 62-201536 | 9/1987 |
| JP | 9-248119 | 9/1997 |
| JP | 2002-320438 | 11/2002 |

* cited by examiner

*Primary Examiner* — David Sorkin
(74) *Attorney, Agent, or Firm* — Wenderoth, Lind & Ponack, L.L.P.

(57) ABSTRACT

An easily cleanable horizontal mixer (10) includes a mixing bowl (18), a roof (22) configured to close an upper opening of the mixing bowl, and a material feed tube (24) provided on the roof and communicated with a material feed port formed in the roof. A rotatable lid (26) is disposed in the material feed tube. The lid has an inner surface (26*a*) that can be set flush with an inner surface (22*a*) of the roof. The mixing bowl has a scraper member (32) provided at an upper end (16*b*) of the mixing bowl defining the upper opening. The scraper member slides on the inner surface of the roof when the mixing bowl is rotated from a mixing operation position to a non-mixing operation position.

9 Claims, 10 Drawing Sheets

HORIZONTAL MIXER

This application is a continuation-in-part of application Ser. No. 12/413,034, filed on Mar. 27, 2009, now U.S. Pat. No. 8,070,353.

BACKGROUND OF THE INVENTION

The present invention relates to a mixer, more particularly, to a horizontal mixer suitable for mixing of materials to make bread dough in bread making.

DESCRIPTION OF THE RELATED ART

Conventional horizontal mixers include a mixing bowl having an upper opening, a roof configured so as to close the upper opening and having a material feed port for feeding material such as flour and so on into the mixing bowl, a material feed tube extending upwardly from the periphery of the material feed port to define a material feed passage extending vertically, a rotatable lid disposed in the vertically intermediate portion of the material feed passage and being rotatable between a closed position to close the material feed passage and an open position to open the material feed passage, and an agitating blade rotatably driven in the mixing bowl around a horizontal axis. Materials fed through the material feed port into the mixing bowl are agitated by means of the agitating blade (See, for example, Japanese Patent Application Publication No. 09-248119).

In the conventional horizontal mixers, material agitated by means of the agitating blade splashes and adheres to the inner surface of the roof and the inside of the material feed tube, which makes cleaning of the mixer difficult. Further, there has been a problem that if dough adhering to the roof and solidified there falls down, it may be mixed into prepared dough.

SUMMARY OF THE INVENTION

The present invention aims to solve the problem as stated above.

The present invention provides a horizontal mixer including a mixing bowl having an upper opening; a roof configured to close the upper opening and having a material feed port; a material feed tube attached to the roof and extending upwardly from a periphery of the material feed port to define a material feed passage extending through the material feed port; and, a lid disposed in the material feed tube and being movable between a closed position to close the material feed port and an open position to open the material feed port. The lid has an inner surface that is, at the closed position, brought into a position where the inner surface is substantially flush with an inner surface of the roof.

In this horizontal mixer, since the inner surface of the lid can be set substantially flush with the inner surface of the roof, it becomes easy to remove material that might adheres to the inner surfaces of the lid and the roof during mixing of the material, thereby enabling easy cleaning of the mixer.

Specifically, the mixing bowl includes a bottom wall and a peripheral wall extending upward from the bottom wall thereof to the upper opening. Further, the mixing bowl is rotatable about a horizontal axis between a mixing operation position where the upper opening is directed upward and closed by the roof for mixing of material fed into the mixing bowl and a non-mixing operation position where the upper opening is displaced from the roof. Furthermore, the mixing bowl has, at an upper end of the peripheral wall defining the upper opening, a scraper member that is configured to slide on the inner surface of the roof to scrape off material adhered to the inner surface during mixing of the material when the mixing bowl is rotated from the mixing operation position to the non-mixing operation position.

The roof may be made of a plate member and comprise a horizontal central flat portion extending in parallel with the horizontal axis having the material feed port therein and inclined flat portions connected to the horizontal central flat portion at the opposite side edges of the central flat portion extending in parallel with the horizontal axis, the inclined flat portions gradually inclining downward as the inclined flat portions extend from the respective side edges.

The scraper member may be urged against the inner surface of the roof so as to resiliently engage with the inner surface of the roof.

The scraper member may be shiftable relative to the upper edge of the peripheral wall.

Specifically, the scraper member may be shiftable between a scraping position and a cleaning position. The scraper member at the scraping position is slidable on the inner surface of the roof when the mixing bowl is rotated from the mixing operation position to the non-mixing operation position. In the cleaning position, the scraper member is shifted outward from the scraping position to make it easy to clean the scraper member and the upper end of the peripheral wall of the mixing bowl.

More specifically, the scraper member may be shiftable inward from the scraping position to a retracted position. When the mixing bowl is rotated from the non-mixing operation position to the mixing operation position, the scraper can be shifted to the retracted position.

Further, the mixing bowl may have a piston cylinder device mounted on the upper end of the peripheral wall of the mixing bowl to effect the shifting of the scraper member.

Furthermore, the piston cylinder device may comprises a first piston cylinder unit including a first cylinder mounted on the upper end of the mixing bowl and a first piston that is movable with respect to the first cylinder in an axial direction of the first cylinder, and a second piston cylinder unit including a second cylinder secured to the first piston and a second piston that is movable with respect to the second cylinder in an axial direction of the second cylinder parallel to the axial direction of the first cylinder and securely connected with the scraper plate.

An embodiment of the horizontal mixer according to the present invention is described as follows with reference to the accompanying drawings.

DESCRIPTION OF THE PREFERRED EMBODIMENT

First, basic configurations and operation of the horizontal mixer 10 according to the present invention will be described with reference to FIG. 1 to FIG. 6. As shown by the figures, the horizontal mixer 10 includes a mixing bowl 18 having an upper opening 12, a roof 22 configured so as to close the upper opening 12 of the mixing bowl, a frame 11 (FIG. 6) for supporting the mixing bowl 18 and the roof 22.

The mixing bowl 18 includes a bottom wall 14 and a peripheral wall extending from the bottom wall to the upper opening 12. Specifically, the mixing bowl 18 comprises a U-shaped wall 16-1 and a pair of plate-shaped walls 16-2 to close the open sides of the U-shaped wall. The mixing bowl is provided therein with a rotational agitating blade (not shown) for mixing and kneading materials such as flour and water fed into the mixing bowl.

Figure 7:
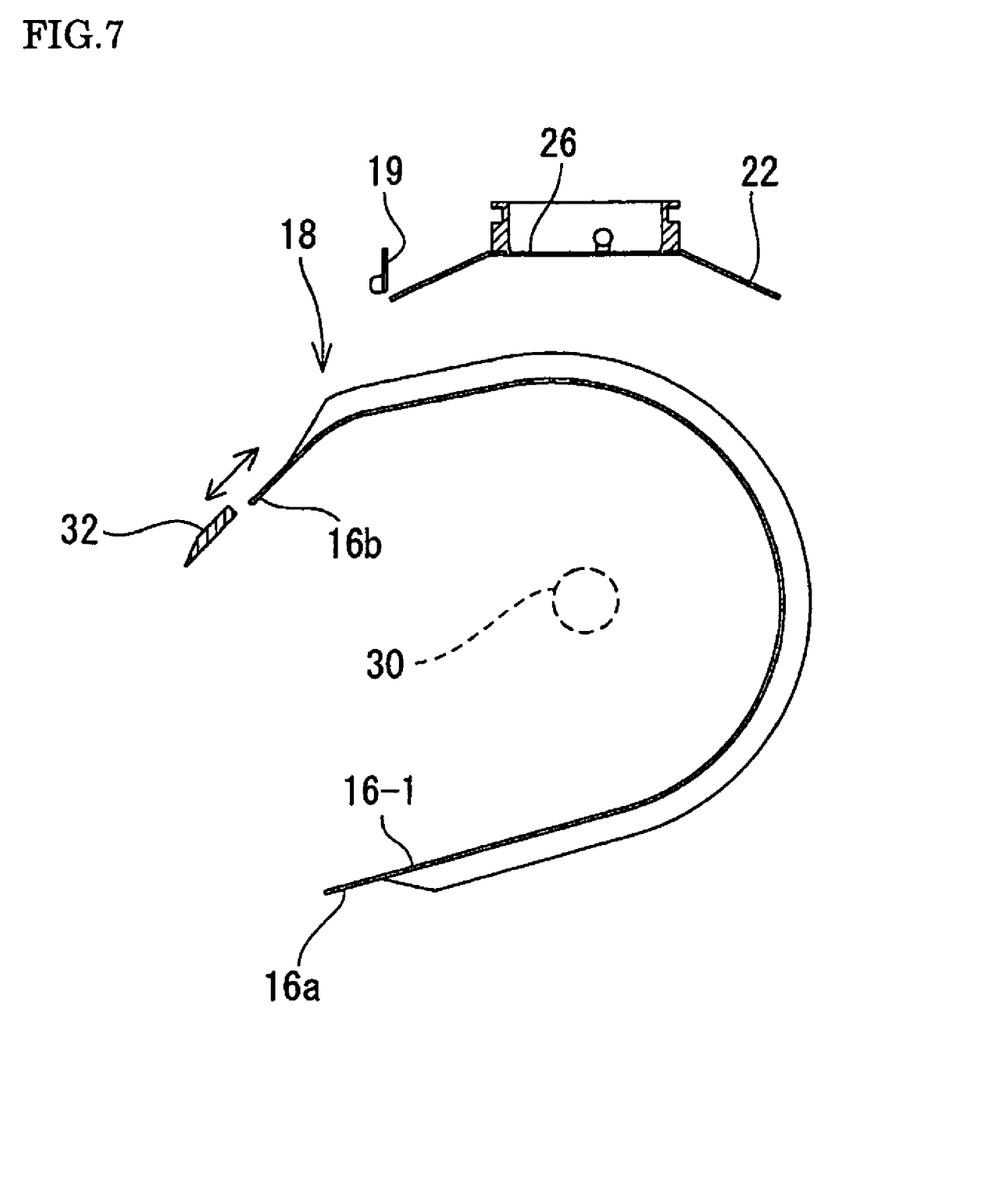
FIG. 7 shows a state in which the mixing bowl has been rotated to the non-mixing operation position for taking out material or cleaning the mixing bowl.

The pair of plate-shaped walls 16-2 are rotatably supported by means of a pair of supporting shafts 30 extending from the frame 11 and aligned with each other in the horizontal direction so that the mixing bowl 18 is rotatable between a mixing operation position (FIGS. 1 to 3) for mixing the material in the mixing bowl wherein the upper opening 12 is directed upward and closed by the roof 22, and a non-mixing operation position wherein the upper opening 12 is displaced from the roof 22 and turned sideways (FIG. 5) or obliquely downward (FIG. 7) for taking mixed material out of the mixing bowl 18 or for cleaning the inside of the mixing bowl.

Figure 6:
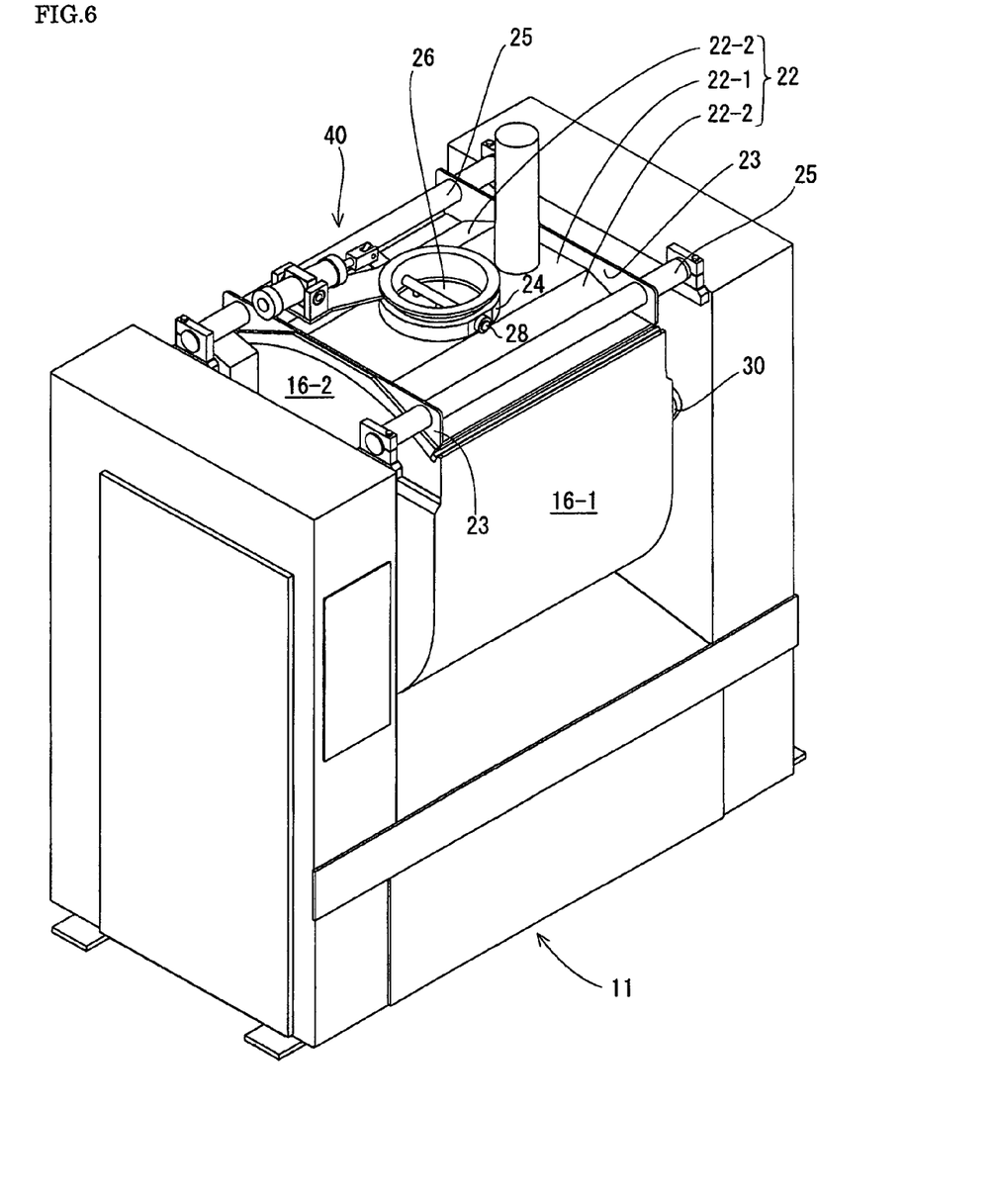
FIG. 6 is a perspective view showing the whole of the horizontal mixer according to the present invention.

The roof 22 is made of a bent plate-shaped member, which has, as shown in FIG. 1 to FIG. 5, a horizontal center portion 22-1 and inclined portions 22-2 connected to the opposite side edges of the horizontal center portion and inclining downward as they extend from the respective edges. The horizontal center portion 22-1 is provided with a material feed port 20 and a tubular material feed tube 24 extending upwardly from the periphery of the material feed port. The material feed tube 24 is provided therein with a lid 26 configured to be rotatable around a horizontal shaft 28 between a closed position (FIG. 1) to close the material feed port 20 and an open position (FIG. 2) to open the material feed port 20. On the roof, there is provided a piston cylinder mechanism 40 for rotating the lid 26. The inner surface 26a of the lid 26 is disposed to be flush with the inner surface 22a of the roof 22 when the lid 26 is at the closed position. As shown in FIG. 6, the roof 22 has flanges 23 disposed along both ends, respectively, and a pair of horizontal supporting bars 25 secured to the frame 11 passing through the flanges, whereby the roof 22 is secured to the frame.

The mixing bowl 18 has a scraper member or plate 32 made of resilient material such as plastic provided on an upper end or edge 16b of the U-shaped wall 16-1. The scraper plate 32 is in the shape of an elongated plate and extends along the upper edge 16b. When the mixing bowl 18 is at the mixing operation position, the scraper plate extends upwardly from the upper edge 16b by a slight amount and engages with the lower surface of the roof 22 at one end of the roof (the right end as viewed in FIGS. 1-3). When the mixing bowl 18 is rotated toward the non-mixing operation position for taking the mixed material out of the mixing bowl 18, the scraper plate 32 slides on the inner surface 22a of the roof. In the illustrated example, when the mixing bowl 18 is moved from the non-mixing operation position back to the mixing operation position, an upper edge 16a of the mixing bowl 18 opposite to the upper edge 16b engages with a stopper 19 to stop the mixing bowl.

The followings describe an example of the operation of the horizontal mixer 10.

Figure 1:
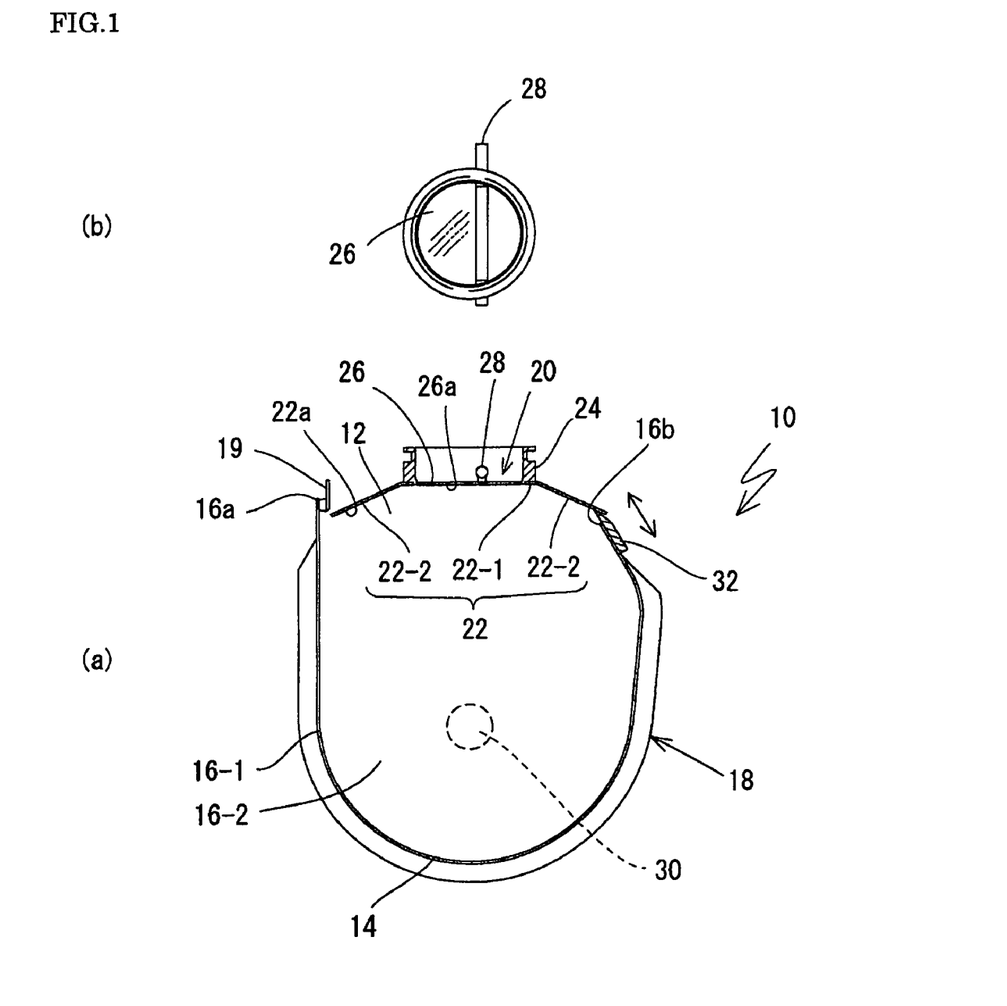
FIG. 1 is a schematic view of a horizontal mixer according to the present invention wherein (a) shows a vertical sectional side view of the mixer with a lid thereof positioned at a closed position to close a material feed port and (b) shows a top view of a material feed tube provided on a roof of the mixer.
Figure 2:
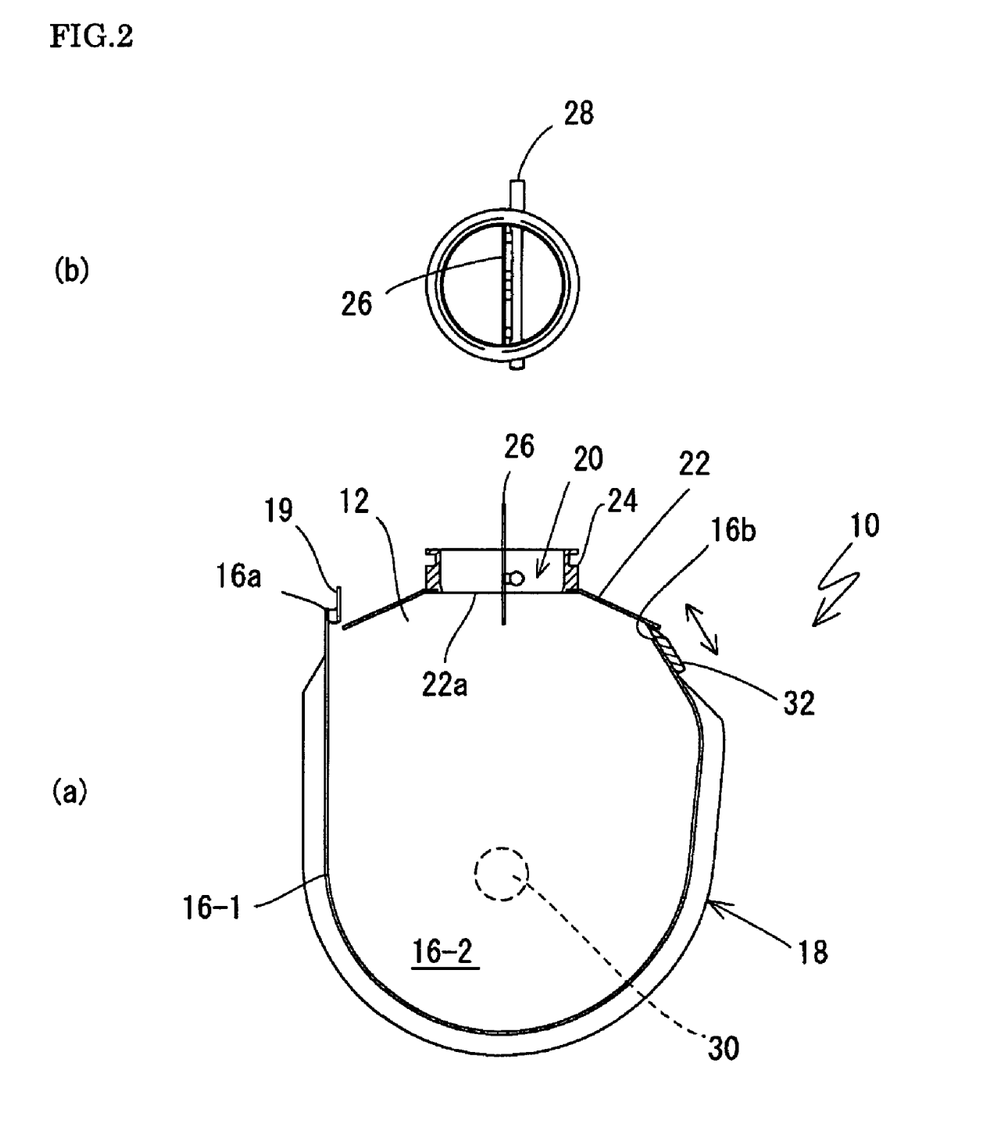
FIG. 2 is a view similar to FIG. 1 wherein (a) shows a state in which the lid is at the open position to open the material feed port on the horizontal mixer and (b) shows a top view of the material feed tube in the above state.

First, the lid 26 of the mixing bowl 18 is rotated to the open position (FIG. 2b) of the material feed port 20, and then flour is fed through the material feed tube 24 into the mixing bowl. The lid 26 is then rotated to the closed position (FIG. 1b) of the material feed port 20. In this state, the inner surface 26a of the lid 26 is flush with the inner surface 22a of the roof 22, i.e., the inner surface 22a of the roof and the inner surface of the lid form a single continuous surface together.

Then, the mixing bowl 18 is rotated around the rotating shafts 30 (FIG. 4) to form a gap G between the roof 22 and the peripheral wall 16. Then, water and other materials are fed from the gap G. After that, the mixing bowl 18 is moved back to the original mixing position, then the agitating blade is actuated to perform mixing.

Figure 3:
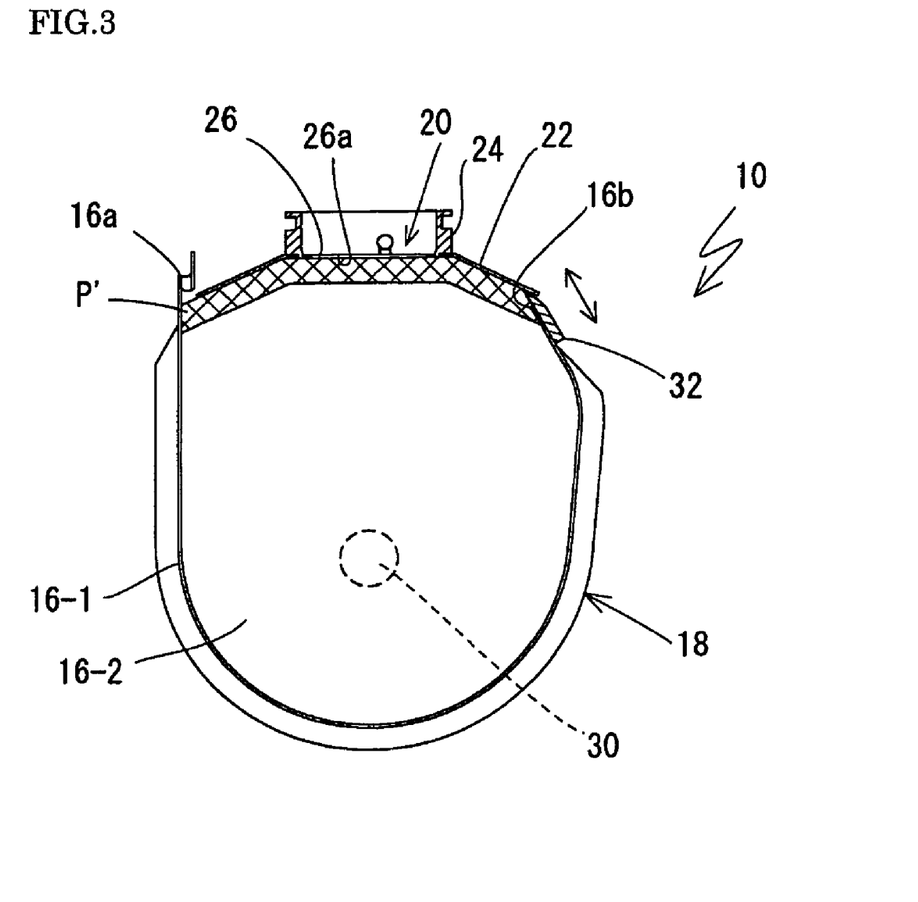
FIG. 3 is a view similar to FIG. 1 and shows a state in which material has adhered to the inner surfaces of the lid and the roof of the horizontal mixer during mixing of the material in the mixer.
Figure 4:
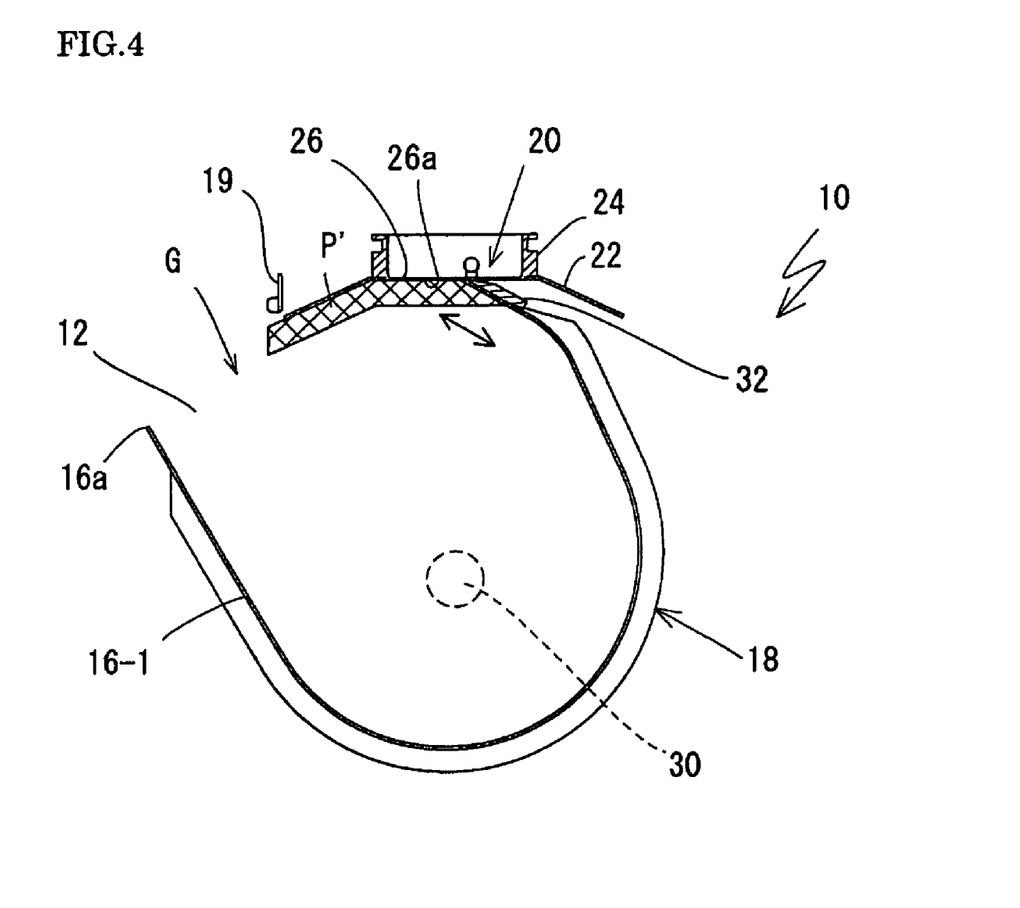
FIG. 4 is a view similar to FIG. 1 and shows a state in which the mixing bowl of the horizontal mixer is being rotated from a mixing operation position to a non-mixing operation position and the material adhered to the inner surfaces of the lid and the roof is scraped off by means of a scraper member or plate mounted on an upper end of the mixing bowl.
Figure 5:
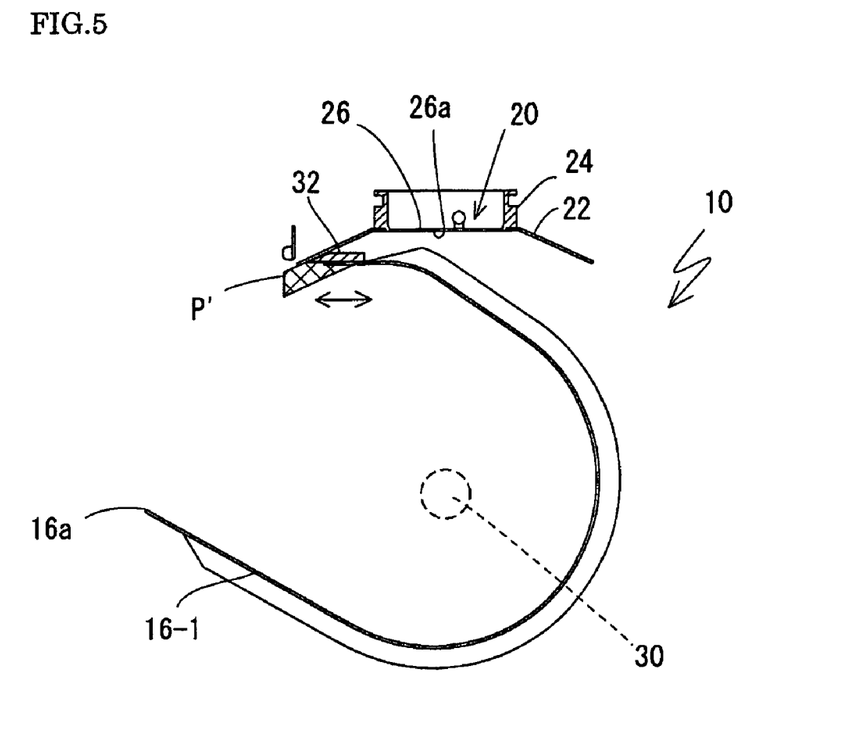
FIG. 5 shows a state in which the mixing bowl has almost been rotated from the mixing operation position to the non-mixing operation position and the adhering material on the inner surface of the roof has been almost completely scraped off.

When the mixing is finished, the material P' splashed by the agitating blade adheres to the inner surface 26a of the lid 26, and the inner surface 22a of the roof 22 (FIG. 3).

When the mixing bowl 18 is rotated from the mixing operation position to the non-mixing operation position in order to take out the mixed material, the scraper plate 32 slides on the inner surface 26a of the lid 26 and the inner surface 22a of the roof 22, thereby scraping off the material P' from those inner surfaces (FIGS. 4, 5), whereby it facilitates easy cleaning of the mixer compared with that of the above-described conventional mixer.

It has been confirmed that the scraped material P' in the above case has almost the same property as the mixed material. Therefore, even though the scraped material P' is mixed into the mixed material, it does not have an adverse effect on bread making.

Although a resilient plastic member is used for the scraper plate 32 in the above described embodiment, a metal plate may be instead used. The metal plate is resiliently urged against the inner surface 22a of the roof by means of a spring.

Figure 8:
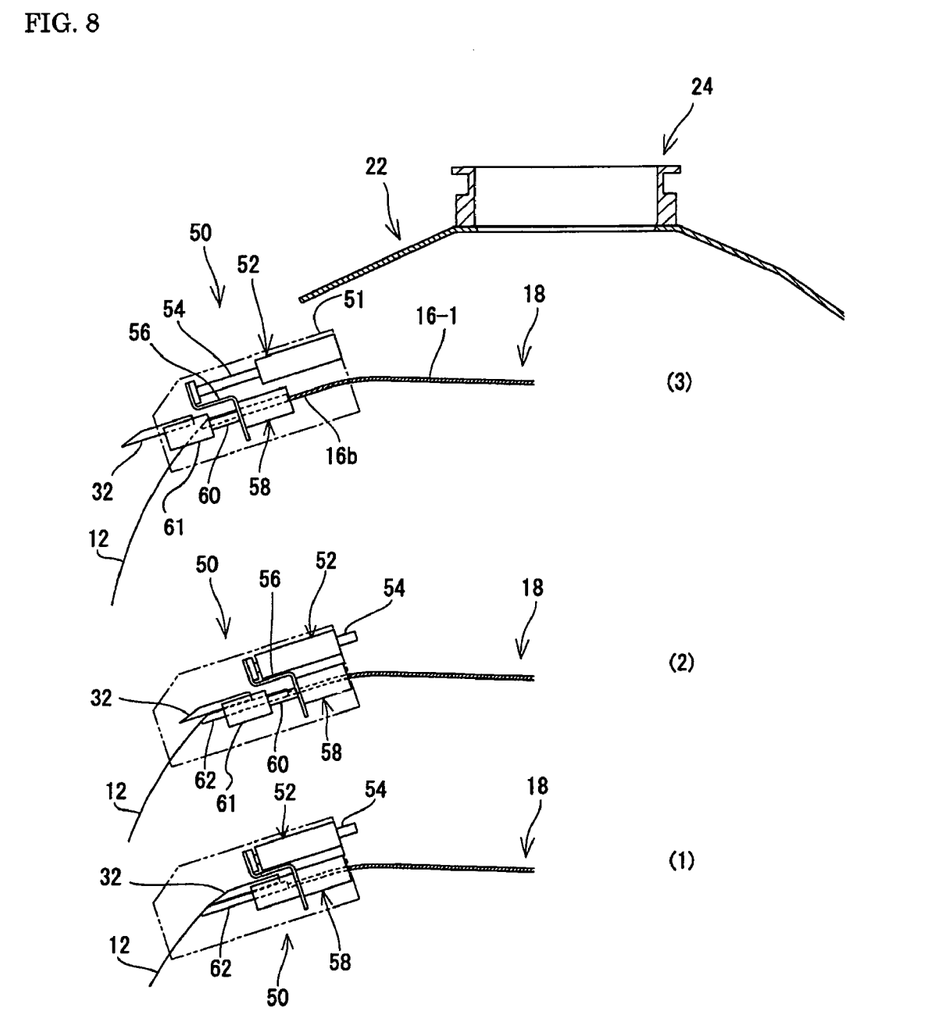
FIG. 8 includes schematic views for the scraper plate and a piston cylinder device for moving the scraper plate wherein (1) shows a state in which the scraper plate is at a retracted position, (2) shows a state in which the scraper plate is at a scraping position, and (3) shows a state in which the scraper plate is at a cleaning position.
Figure 9:
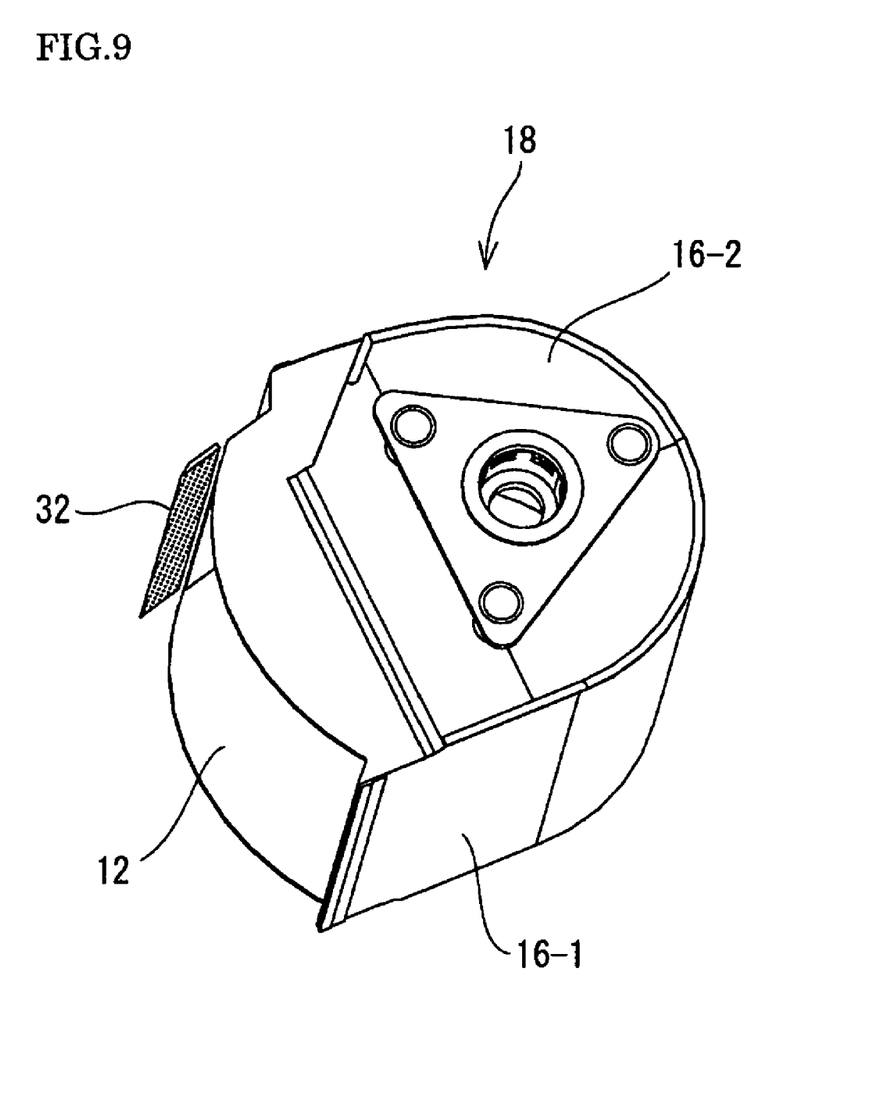
FIG. 9 is a view of the mixing bowl positioned at the non-mixing operation position viewed from below diagonally, in which the scraper plate is positioned at the cleaning position.
Figure 10:
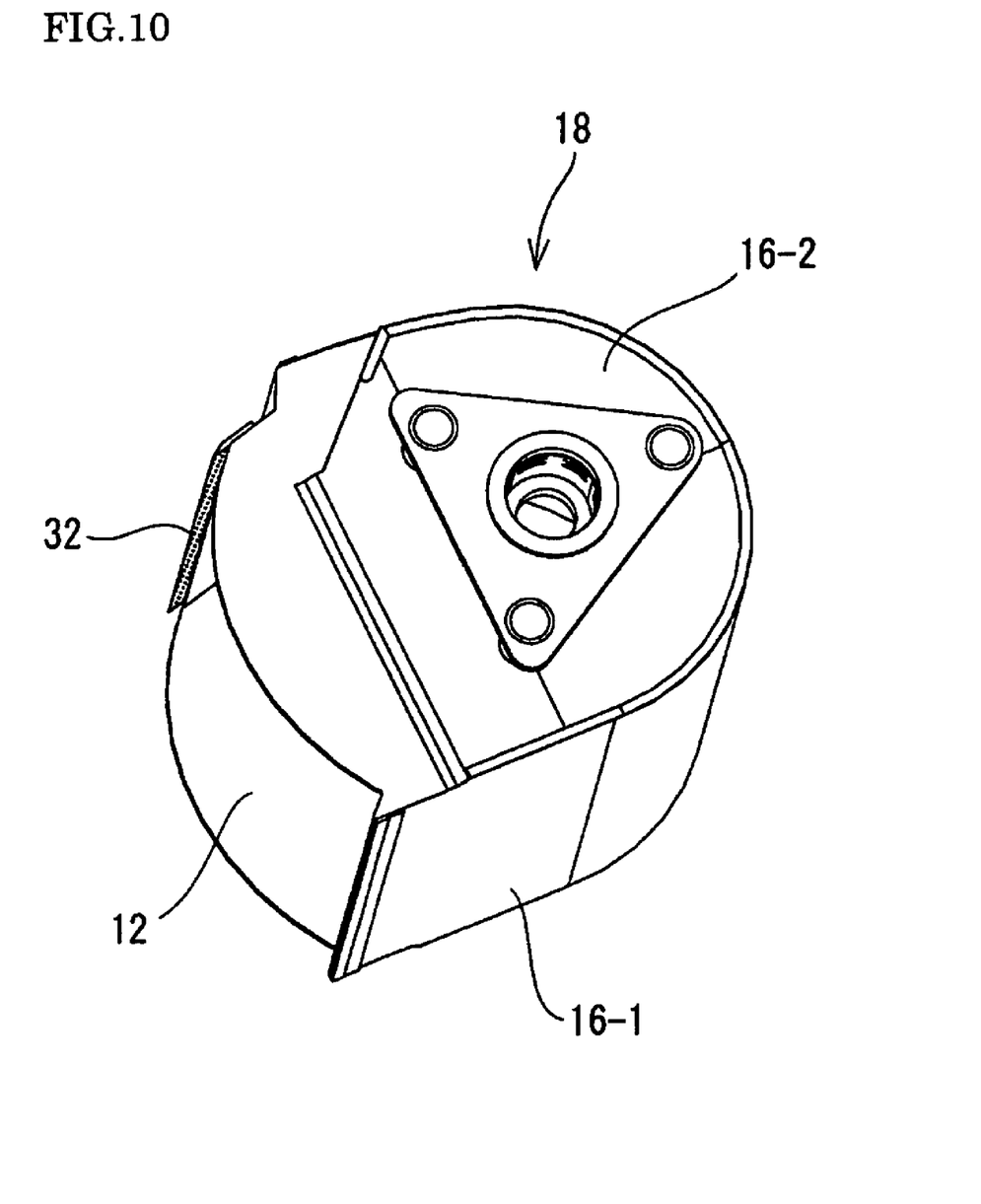
FIG. 10 is similar to FIG. 9 and shows a state in which the scraper plate is positioned at the scraping position.

As shown in FIG. 8 to FIG. 10, the scraper plate 32 may be made shiftable with respect to an upper edge 16b of the U-shaped wall 16-1. When the mixing bowl 18 is rotated from the mixing operation position to the non-mixing operation position, the scraper plate 32 is positioned at a scraping position shown in FIG. 8(2) and FIG. 10 so that the scraper plate 32 slides over the inner surface 26a of the lid 26 and the inner surface 22a of the roof 22 to scrape off the adhering material P'. When the mixing bowl is returned to the mixing operation position from the non-mixing operation position, the scraper plate 32 is retracted from the scraping position to a retracted position shown in FIG. 8(1). When the scraper plate 32 is positioned at the non-mixing operation position for cleaning thereof, the scraper is pushed out from the scraping position to a cleaning position shown in FIG. 8(3) and FIG. 9.

FIG. 8 schematically shows the piston cylinder device for shifting the scraper plate 32. The piston cylinder device comprises a pair of piston cylinder units 50 (only one of which is shown) mounted on the opposite ends of the upper edge 16b of the U-shaped wall 16-1. Each of the cylinder units 50 comprises a first piston cylinder unit 52 secured to the upper edge 16b of the U-shaped wall 16-1 through a supporting member 51, and a second piston cylinder unit 58 which is securely connected to the tip end of a piston rod 54 of the first piston cylinder unit 52 through a connecting member 56. The scraper plate 32 is positioned between the tip ends of the piston rods 60 of the second piston cylinder unit 58 and securely connected to the tip ends of the piston rod 60 through holding members 61. The piston rods 52 and 60 are movable in a direction normal to the upper edge 16b of the U-shaped wall or the longitudinal axis of the scraper plate 32. The holding members 61 are slidably engaged with and guided by corresponding guide rail members 62 secured to the opposite ends of the upper edge 16b of the U-shaped wall 16-1 and extending normal to the upper edge 16b.

When the scraper plate 32 is positioned at the retracted position shown in FIG. 8(1), the piston rods 54 and 60 of the first piston cylinder units 52 and the second piston units 58 are retracted. In order to bring the scraper plate 32 to the scraping position shown in FIG. 8(2), the piston rods 60 of the second piston cylinder units 58 are extended. Further, in order to bring the scraper plate 32 to the cleaning position shown in FIG. 8(3), the piston rods 54 of the first cylinder units 52 are extended. At the cleaning position, the scraper plate 32 is spaced apart from the upper edge 16b of the U-shaped wall to thereby enable the scraper plate and the piston cylinder device to be cleaned easily.

It should be noted that the present invention is not necessarily limited to the foregoing embodiments but can be modified in a variety of ways without departing from the gist of the present invention. For example, although the lid 26 is configured to be rotatable in the illustrated embodiment, the lid may be configured to be slidable.

What is claimed is:

1. A horizontal mixer comprising:
a mixing bowl having an upper opening;
a roof configured to close the upper opening and having a material feed port;
a material feed tube attached to the roof and extending upwardly from a periphery of the material feed port to define a material feed passage extending through the material feed port; and
a lid disposed in the material feed tube and being movable between a closed position to close the material feed port and an open position to open the material feed port,
wherein the lid has an inner surface that is, at the closed position, brought into a position where the inner surface is substantially flush with an inner surface of the roof,
wherein the mixing bowl includes a bottom wall and a peripheral wall extending upward from the bottom wall to the upper opening,
wherein the mixing bowl is rotatable about a horizontal axis between a mixing operation position where the upper opening is directed upward and closed by the roof for mixing of material fed into the mixing bowl and a non-mixing operation position where the upper opening is displaced from the roof, and
wherein the mixing bowl has, at an upper end of the peripheral wall defining the upper opening, a scraper member that is configured to slide on the inner surface of the roof to scrape off material adhered to the inner surface during mixing of the material when the mixing bowl is rotated from the mixing operation position to the non-mixing operation position.

2. The horizontal mixer according to claim 1, wherein the roof is made of a plate member and comprises a horizontal central flat portion extending in parallel to the horizontal axis having the material feed port therein and inclined flat portions connected to the horizontal central flat portion at the opposite side edges of the central flat portion extending in parallel with the horizontal axis, the inclined flat portions gradually inclining downward as the inclined flat portions extend from the respective side edges.

3. The horizontal mixer according to claim 1, wherein the scraper member is urged against the inner surface of the roof so as to resiliently engage with the inner surface of the roof.

4. The horizontal mixer according to claim 1, wherein the scraper member is shiftable relative to the upper edge of the peripheral wall.

5. The horizontal mixer according to claim 1, wherein the scraper member is shiftable between a scraping position, the scraper member at the scraping position being slidable on the inner surface of the roof when the mixing bowl is rotated from the mixing operation position to the non-mixing operation position, and a cleaning position where the scraper member is shifted outward from the scraping position.

6. The horizontal mixer according to claim 5, wherein the scraper member is shiftable inward from the scraping position to a retracted position.

7. The horizontal mixer according to claim 5, wherein the mixing bowl has a piston cylinder device mounted on the upper end of the peripheral wall thereof to effect the shifting of the scraper member.

8. The horizontal mixer according to claim 6, wherein the mixing bowl has a piston cylinder device mounted on the upper end of the peripheral wall thereof to effect the shifting of the scraper member,
wherein the piston cylinder device includes
(i) a first piston cylinder unit including a first cylinder mounted on the upper end of the mixing bowl and a first piston that is movable with respect to the first cylinder in an axial direction of the first cylinder, and
(ii) a second piston cylinder unit including a second cylinder secured to the first piston and a second piston that is movable with respect to the second cylinder in an axial direction of the second cylinder parallel to the axial direction of the first cylinder and securely connected with the scraper member.

9. The horizontal mixer according to claim 6, wherein the scraper member is an elongated member extending in parallel with the horizontal axis,
wherein the mixing bowl has a piston cylinder device mounted on the upper end of the peripheral wall thereof to effect the shifting of the scraper member, and
wherein the piston cylinder device includes
(i) two first piston cylinder units positioned adjacent to opposite ends of the scraper member, respectively, and each including a first cylinder mounted on the upper end of the mixing bowl and a first piston that is movable with respect to the first cylinder in a direction of an axis of the first cylinder extending normal to a longitudinal axis of the elongated member, and
(ii) two second piston cylinder units each including a second cylinder secured to the corresponding first piston and a second piston that is movable with respect to the second cylinder in parallel with the axis of the first cylinder and securely connected to a corresponding one of the opposite ends of the scraper member.

* * * * *